(12) United States Patent
Kumaresan et al.

(10) Patent No.: US 12,261,955 B2
(45) Date of Patent: *Mar. 25, 2025

(54) SYSTEM AND COMPUTER PROGRAM PRODUCT FOR FAIR, SECURE N-PARTY COMPUTATION USING AT LEAST ONE BLOCKCHAIN

(71) Applicant: Visa International Service Association, San Francisco, CA (US)

(72) Inventors: Ranjit Kumar Kumaresan, Sunnyvale, CA (US); Srinivasan Raghuraman, Cambridge, MA (US); Rohit Sinha, Bokaro Steel (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,301

(22) Filed: Sep. 26, 2023

(65) Prior Publication Data

US 2024/0022417 A1 Jan. 18, 2024

Related U.S. Application Data

(63) Continuation of application No. 17/104,520, filed on Nov. 25, 2020, now Pat. No. 11,811,933.
(Continued)

(51) Int. Cl.
*H04L 9/32* (2006.01)
*H04L 9/00* (2022.01)
*H04L 9/30* (2006.01)

(52) U.S. Cl.
CPC .............. *H04L 9/3218* (2013.01); *H04L 9/30* (2013.01); *H04L 9/3247* (2013.01); *H04L 9/50* (2022.05); *H04L 2209/46* (2013.01)

(58) Field of Classification Search
None
See application file for complete search history.

(56) References Cited

U.S. PATENT DOCUMENTS

| 7,181,017 | B1 | 2/2007 | Nagel et al. |
| 9,419,951 | B1 | 8/2016 | Felsher et al. |

(Continued)

FOREIGN PATENT DOCUMENTS

| CN | 107993059 A | 5/2018 |
| CN | 108288159 A | 7/2018 |

(Continued)

OTHER PUBLICATIONS

Choudhuri, Arka et al. "Fairness in and Unfair World: Fair Multi-party Computation from Public Bulletin Boards" [online] IEEE, Oct. 30, 2017 [retrieved Apr. 19, 2023]. Retrieved from the Internet: URL: https://dl.acm.org/doi/10.1145/3133956.3134092 (Year: 2017).*

(Continued)

*Primary Examiner* — Taghi T Arani
*Assistant Examiner* — Joshua Raymond White
(74) *Attorney, Agent, or Firm* — The Webb Law Firm

(57) ABSTRACT

Described are a system and computer program product for secure n-party computation. The system includes a computing device programmed or configured to communicate an input to a trusted execution environment (TEE), and receive a first encrypted output. The computing device is also programmed or configured to post the first encrypted output on a blockchain and receive a first proof of publication. The computing device is further programmed or configured to communicate the first proof of publication to the TEE and receive the first function output of the n-party computation. The computing device is further programmed or configured to communicate a witness to the TEE and receive a second encrypted output. The computing device is further pro- (Continued)

grammed or configured to post the second encrypted output on the blockchain, receive a second proof of publication, communicate the second proof of publication to the TEE, and receive the second function output.

14 Claims, 5 Drawing Sheets

Related U.S. Application Data

(60) Provisional application No. 62/941,045, filed on Nov. 27, 2019.

(56) References Cited

U.S. PATENT DOCUMENTS

| | | | |
|---|---|---|---|
| 10,601,828 | B2 | 3/2020 | Avetisov et al. |
| 10,846,694 | B2 | 11/2020 | Wong et al. |
| 11,159,313 | B2 | 10/2021 | Fletcher |
| 11,251,942 | B2 | 2/2022 | Li et al. |
| 11,658,815 | B2 | 5/2023 | Ranellucci |
| 11,811,933 | B2 * | 11/2023 | Kumaresan ........... H04L 9/3218 |
| 2008/0095360 | A1 | 4/2008 | Vuillaume et al. |
| 2018/0225448 | A1 | 8/2018 | Russinovich et al. |
| 2019/0034936 | A1 | 1/2019 | Nolan et al. |
| 2019/0095879 | A1 | 3/2019 | Eyal et al. |
| 2019/0132295 | A1 | 5/2019 | Lenz et al. |
| 2019/0156301 | A1 * | 5/2019 | Bentov ................ G06Q 20/405 |
| 2019/0166488 | A1 | 5/2019 | Park et al. |
| 2019/0222414 | A1 | 7/2019 | Pe'er et al. |
| 2019/0251249 | A1 | 8/2019 | Sprague et al. |
| 2019/0319803 | A1 | 10/2019 | Misoczki et al. |
| 2020/0014546 | A1 | 1/2020 | Karame et al. |
| 2020/0036707 | A1 | 1/2020 | Callahan et al. |
| 2020/0074464 | A1 | 3/2020 | Trevethan |
| 2020/0296128 | A1 | 9/2020 | Wentz |
| 2021/0119792 | A1 | 4/2021 | Bastable et al. |
| 2021/0288944 | A1 | 9/2021 | Petri et al. |
| 2021/0336792 | A1 | 10/2021 | Agrawal et al. |
| 2021/0377045 | A1 | 12/2021 | Doney et al. |
| 2022/0006620 | A1 | 1/2022 | Bursell et al. |
| 2022/0021524 | A1 | 1/2022 | Peddada et al. |
| 2022/0045867 | A1 | 2/2022 | Beery et al. |

FOREIGN PATENT DOCUMENTS

| | | |
|---|---|---|
| CN | 110008686 A | 7/2019 |
| CN | 110651291 A | 1/2020 |
| CN | 110999204 A | 4/2020 |
| CN | 111181720 A | 5/2020 |
| WO | 2020157756 A1 | 8/2020 |
| WO | 2020223918 A1 | 11/2020 |

OTHER PUBLICATIONS

Bentov, Iddo et al. "Tesseract: Real-Time Cryptocurrency Exchange Using Trusted Hardware" [online] IEEE, Nov. 6, 2019 [ retrieved Apr. 19, 2023]. Retrieved from the Internet: URL: https://dl.acm.org/doi/abs/10.1145/3319535.3363221 (Year: 2019).*

Kosba, Ahmed et al. "Hawk: The Blockchain Model of Cryptography and Privacy-Preserving Smart Contracts" [online] IEEE, Aug. 18, 2016 [retrieved [Apr. 19, 2023]. Retrieved from the Internet: URL: https://ieeexplore.ieee.org/document/7546538 (Year: 2016).*

Boyle, Elette et al. "Practical Fully Secure Three-Party Computation via Sublinear Distributed Zero-Knowledge Proofs" [online] IEEE, Nov. 6, 2019 [retrieved Apr. 19, 2023]. Retrieved from the Internet: URL: https://dl.acm.org/doi/10.1145/3319535.3363227 (Year: 2019).*

Ahmed et al., "Don't Mine, Wait in Line: Fair and Efficient Blockchain Consensus with Robust Round Robin", Jan. 11, 2019, 15 pages.

Androulaki et al., "Hyperledger Fabric: A Distributed Operating System for Permissioned Blockchains", Apr. 17, 2018, 15 pages.

Bellare et al., "Authenticated Encryption: Relations among Notions and Analysis of the Generic Composition Paradigm", J. Cryptol, 2008, pp. 469-491, vol. 21.

Bentov et al., "Tesseract: Real-Time Cryptocurrency Exchange Using Trusted Hardware", CCS '19, Nov. 11-15, 2019, pp. 1521-1538, London, United Kingdom.

Boyle et al., "Practical Fully Secure Three-Party Computation via Sublinear Distributed Zero-Knowledge Proofs", 2019, 37 pages.

Choudhuri et al., "Fairness in an Unfair World: Fair Multiparty Computation from public Bulletin Boards", Proceedings of the 2017 ACM SIGSAC Conference on Computer and Communications Security, 2017, 35 pages.

Fisch et al., "IRON: Functional Encryption using Intel SGX", Proceedings of the 2017 ACM SIGSAC Conference on Computer and Communications Security, 2017, 37 pages.

Gilad et al., "Algorand: Scaling Byzantine Agreements for Cryptocurrencies", SOSP' 17, Oct. 28-31, 2017, Shanghai, China, pp. 51-68.

Goldwasser et al., "A Digital Signature Scheme Secure Against Adaptive Chosen-Message Attacks", Siam J. Comput, 1988, pp. 281-308, vol. 17:2.

Hofheinz et al., "A Modular Analysis of the Fujisaki-Okamoto Transformation", SIAM Journal of Computing, Apr. 1988, pp. 281-308, vol. 17:2.

Kosba et al., "Hawk: The Blockchain Model of Cryptography and Privacy-Preserving Smart Contracts", 2016 IEEE Symposium on Security and Privacy, pp. 839-858.

Kumaresan et al., "Synchronizable Fair Exchange", Cryptology ePrint Archive, Oct. 7, 2020, pp. 1-56.

Pass et al., "Formal Abstractions for Attested Execution Secure Processors", EUROCRYPT 2017, Part I, LNCS 10210, International Association for Cryptologic Research, 2017, pp. 260-289.

Ray, "Fair Multi-Party Computation on the Blockchain", https://medium.com/hackernoon/fair-multi-party-computation-on-the-blockchain-67d13af13f65, Feb. 24, 2020, 4 pages.

Sinha et al., "LucidiTEE: A TEE-Blockchain System for Policy-Compliant Multiparty Computation with Fairness", Apr. 17, 2019, 18 pages.

Soltani et al., "Practical Key Recovery Model For Self-Sovereign Identity Based Digital Wallets", 2019 IEEE Intl Conference on Dependable, Autonomic and Secure Computing, Intl Conf on Pervasive Intelligence and Computing, Intl Conf on Cloud and Big Data Computing, Intl Conf on Cyber Science and Technology Congress, 2019, pp. 320-325.

Xiao et al., "A Survey of Distributed Consensus Protocols for Blockchain Networks", IEEE Communications Surveys & Tutorials, 2020, pp. 1-34, vol. 22, No. 2.

Yahmed et al., "Trust Execution Environment and Multi-party Computation for Blockchain e-Health Systems", The Impact of Digital Technologies on Public Health in Developed and Developing Countries: 18th International Conference, ICOST, 2020, pp. 277-286.

* cited by examiner

SYSTEM AND COMPUTER PROGRAM PRODUCT FOR FAIR, SECURE N-PARTY COMPUTATION USING AT LEAST ONE BLOCKCHAIN

CROSS-REFERENCE TO RELATED APPLICATIONS

This application is a continuation of U.S. patent application Ser. No. 17/104,520, filed Nov. 25, 2020, titled "System and Method for Fair, Secure N-Party Computation Using At Least One Blockchain," which claims priority to U.S. Provisional Patent Application No. 62/941,045, filed on Nov. 27, 2019, titled "System, Method, and Computer Program Product for Fair, Secure N-Party Computation Using At Least One Blockchain", the disclosures of which are incorporated by reference herein in their entireties.

BACKGROUND

1. Technical Field

Disclosed embodiments or aspects relate generally to fair exchange computer protocols and, in one particular embodiment or aspect, to a system, method, and computer program product for secure n-party computation having fair output delivery using a bulletin board abstraction.

2. Technical Considerations

Secure multiparty computation (MPC) allows a set of parties to perform a joint computation on their inputs that reveals only the final output and nothing else. These parties may be mutually distrusting and require a secure protocol to ensure a fair exchange. Secure computation, however, often cannot provide fairness in settings where many (e.g., a majority, a plurality, half, and/or the like) of the participants are corrupt (e.g., dishonest actors). For instance, in a two-party setting, a malicious party can abort a secure computation protocol after receiving the output, leaving the other party no recourse to obtain the output. Additionally, in some settings, not all parties to may have access to necessary resources (e.g., access to a trusted execution environment, access to one or more blockchains, and/or the like). Additionally, use of a third party as an intermediary for such multiparty computations may waste resources in terms of the number of parties involved, the number of communications needed, and/or the like, and it may be possible for the third party to collude with one of the parties, thereby threatening security and fairness. There is a need to address these and other deficiencies of secure computation.

SUMMARY

Accordingly, provided is an improved system, method, and computer program product for secure n-party (e.g., n>1) computation.

According to some non-limiting embodiments or aspects, provided is a method that may include communicating, with a first computing device, a first input of an n-party computation to a trusted execution environment (TEE). The method also may include receiving, with the first computing device from the TEE, at least one first encrypted output comprising a first function output of the n-party computation encrypted with at least one public key of at least one other computing device. The first function output of the n-party computation may be determined based on the first input and at least one second input from the at least one other computing device. The method may further include posting, with the first computing device, the at least one first encrypted output on at least one blockchain accessible by the at least one other computing device. The at least one first encrypted output may be decryptable using at least one private key of the at least one other computing device to obtain the first function output of the n-party computation. The method may further include, in response to posting the at least one first encrypted output on the at least one blockchain, receiving, with the first computing device, at least one first proof of publication. The method may further include communicating, with the first computing device, the at least one first proof of publication to the TEE. The method may further include, receiving, with the first computing device, the first function output of the n-party computation from the TEE.

In some non-limiting embodiments or aspects, the method may include communicating, with the first computing device, a witness of a witness encryption scheme to the TEE. The method may also include receiving, with the first computing device, at least one second encrypted output including a second function output encrypted with the at least one public key of the at least one other computing device. The second function output may be determined based on the first input, the at least one second input, and the witness. The method may further include posting, with the first computing device, the at least one second encrypted output on the at least one blockchain. The at least one second encrypted output may be decryptable using the at least one private key to obtain the second function output. The method may further include, in response to posting the at least one second encrypted output on the at least one blockchain, receiving, with the first computing device, at least one second proof of publication. The method may further include communicating, with the first computing device, the at least one second proof of publication to the TEE. The method may further include receiving, with the first computing device, the second function output from the TEE.

In some non-limiting embodiments or aspects, the first computing device and the at least one other computing device may be permissioned by a consortium to access the at least one blockchain. The first computing device may be configured with at least read access and write access to the at least one blockchain, and the second computing device may be configured with at least read access to the at least one blockchain.

In some non-limiting embodiments or aspects, the first function output may include a signature of a data object generated based on the first input and the at least one second input. The first input may include a first signature key associated with the first computing device and the at least one second input may include at least one second signature key associated with the at least one other computing device.

In some non-limiting embodiments or aspects, the first computing device may be configured to communicate with the TEE in a first secure communication channel, in which only the TEE is permitted to read communications from the first computing device to the TEE.

According to some non-limiting embodiments or aspects, provided is a computer-implemented method that may include receiving, with a trusted execution environment (TEE), a first input from a first computing device and at least one second input from at least one other computing device. The method also may include generating, with the TEE, a first function output of an n-party computation based on the first input and the at least one second input. The method may further include encrypting, with the TEE, the first function output of the n-party computation using at least one public key of the at least one other computing device to produce at least one first encrypted output. The method may further include communicating, with the TEE, the at least one first encrypted output to the first computing device. The method may further include receiving, with the TEE from the first computing device, at least one first proof of publication associated with the at least one first encrypted output being posted to at least one blockchain accessible by the at least one other computing device. The method may further include, in response to receiving the at least one first proof of publication from the first computing device, communicating, with the TEE, the first function output of the n-party computation to the first computing device.

In some non-limiting embodiments or aspects, the method may include receiving, with the TEE, a witness of a witness encryption scheme from the first computing device. The method may include generating, with the TEE, a second function output based on the first input, the at least one second input, and the witness. The method may further include encrypting, with the TEE, the second function output using the at least one public key to produce at least one second encrypted output. The method may further include communicating, with the TEE, the at least one second encrypted output to the first computing device. The method may further include receiving, with the TEE from the first computing device, at least one second proof of publication associated with the at least one second encrypted output being posted to the at least one blockchain. The method may further include, in response to receiving the at least one second proof of publication from the first computing device, communicating, with the TEE, the second function output to the first computing device.

In some non-limiting embodiments or aspects, the method may include receiving, with the TEE from the at least one other computing device, the at least one first proof of publication. The method may also include, in response to receiving the at least one first proof of publication from the at least one other computing device, communicating, with the TEE, the first function output of the n-party computation to the at least one other computing device. The method may further include receiving, with the TEE from the at least one other computing device, the at least one second proof of publication. The method may further include, in response to receiving the at least one second proof of publication from the at least one other computing device, communicating, with the TEE, the second function output to the at least one other computing device.

In some non-limiting embodiments or aspects, the first function output may include a signature of a data object generated based on the first input and the at least one second input. The first input may include a first signature key associated with the first computing device and the at least one second input may include at least one second signature key associated with the at least one other computing device.

In some non-limiting embodiments or aspects, the TEE may be configured to communicate with the first computing device in a first secure communication channel, in which only the first computing device is permitted to read communications from the TEE to the first computing device. The TEE may be configured to communicate with the at least one other computing device in at least one other secure communication channel, in which only the at least one other computing device is permitted to read communications from the TEE to the at least one other computing device.

According to some non-limiting embodiments or aspects, provided is a system that may include a server including at least one processor operating a trusted execution environment (TEE). The at least one processor may be programmed and/or configured to receive a first input from a first computing device and at least one second input from at least one other computing device. The at least one processor may also be programmed and/or configured to generate a first function output of an n-party computation based on the first input and the at least one second input. The at least one processor may be further programmed and/or configured to encrypt the first function output of the n-party computation using at least one public key of the at least one other computing device to produce at least one first encrypted output. The at least one processor may be further programmed and/or configured to communicate the at least one first encrypted output to the first computing device. The at least one processor may be further programmed and/or configured to receive, from the first computing device, at least one first proof of publication associated with the at least one first encrypted output being posted to at least one blockchain accessible by the at least one other computing device. The at least one processor may be further programmed and/or configured to, in response to receiving the at least one first proof of publication from the first computing device, communicate the first function output of the n-party computation to the first computing device.

In some non-limiting embodiments or aspects, the at least one processor may be further programmed and/or configured to receive a witness of a witness encryption scheme from the first computing device. The at least one processor may be further programmed and/or configured to generate a second function output based on the first input, the at least one second input, and the witness. The at least one processor may be further programmed and/or configured to encrypt the second function output using the at least one public key to produce at least one second encrypted output. The at least one processor may be further programmed and/or configured to communicate the at least one second encrypted output to the first computing device. The at least one processor may be further programmed and/or configured to receive, from the first computing device, at least one second proof of publication associated with the at least one second encrypted output being posted to the at least one blockchain. The at least one processor may be further programmed and/or configured to, in response to receiving the at least one second proof of publication from the first computing device, communicate the second function output to the first computing device.

In some non-limiting embodiments or aspects, the system may include the first computing device. The first computing device and the at least one other computing device may be permissioned by a consortium to access the at least one blockchain. The first computing device may be configured with at least read access and write access to the at least one blockchain, and the second computing device may be configured with at least read access to the at least one blockchain.

In some non-limiting embodiments or aspects, the at least one processor may be further programmed and/or configured to receive, from the at least one other computing device, the at least one first proof of publication. The at least one processor may be further programmed and/or configured to, in response to receiving the at least one first proof of publication from the at least one other computing device, communicate the first function output of the n-party computation to the at least one other computing device. The at least one processor may be further programmed and/or configured to receive, from the at least one other computing device, the at least one second proof of publication. The at least one processor may be further programmed and/or configured to, in response to receiving the at least one second proof of publication from the at least one other computing device, communicate the second function output to the at least one other computing device.

In some non-limiting embodiments or aspects, the first function output may include a signature of a data object generated based on the first input and the at least one second input. The first input may include a first signature key associated with the first computing device and the at least one second input may include at least one second signature key associated with the at least one other computing device.

In some non-limiting embodiments or aspects, the server may be configured to communicate with the first computing device in a first secure communication channel, in which only the first computing device is permitted to read communications from the server to the first computing device. The server may be configured to communicate with the at least one other computing device in at least one other secure communication channel, in which only the at least one other computing device is permitted to read communications from the server to the at least one other computing device.

Other non-limiting embodiments or aspects of the present disclosure will be set forth in the following numbered clauses:

Clause 1: A computer-implemented method comprising: communicating, with a first computing device, a first input of an n-party computation to a trusted execution environment (TEE); receiving, with the first computing device from the TEE, at least one first encrypted output comprising a first function output of the n-party computation encrypted with at least one public key of at least one other computing device, the first function output of the n-party computation determined based on the first input and at least one second input from the at least one other computing device; posting, with the first computing device, the at least one first encrypted output on at least one blockchain accessible by the at least one other computing device, the at least one first encrypted output being decryptable using at least one private key of the at least one other computing device to obtain the first function output of the n-party computation; in response to posting the at least one first encrypted output on the at least one blockchain, receiving, with the first computing device, at least one first proof of publication; communicating, with the first computing device, the at least one first proof of publication to the TEE; and receiving, with the first computing device, the first function output of the n-party computation from the TEE.

Clause 2: The method of clause 1, further comprising: communicating, with the first computing device, a witness of a witness encryption scheme to the TEE; receiving, with the first computing device, at least one second encrypted output comprising a second function output encrypted with the at least one public key of the at least one other computing device, the second function output determined based on the first input, the at least one second input, and the witness; posting, with the first computing device, the at least one second encrypted output on the at least one blockchain, the at least one second encrypted output being decryptable using the at least one private key to obtain the second function output; in response to posting the at least one second encrypted output on the at least one blockchain, receiving, with the first computing device, at least one second proof of publication; communicating, with the first computing device, the at least one second proof of publication to the TEE; and receiving, with the first computing device, the second function output from the TEE.

Clause 3: The computer-implemented method of clause 1 or clause 2, wherein the first computing device and the at least one other computing device are permissioned by a consortium to access the at least one blockchain, wherein the first computing device is configured with at least read access and write access to the at least one blockchain, and the second computing device is configured with at least read access to the at least one blockchain.

Clause 4: The computer-implemented method of any of clauses 1-3, wherein the first function output comprises a signature of a data object generated based on the first input and the at least one second input, wherein the first input comprises a first signature key associated with the first computing device and the at least one second input comprises at least one second signature key associated with the at least one other computing device.

Clause 5: The computer-implemented method of any of clauses 1-4, wherein the first computing device is configured to communicate with the TEE in a first secure communication channel, in which only the TEE is permitted to read communications from the first computing device to the TEE.

Clause 6: A computer-implemented method comprising: receiving, with a trusted execution environment (TEE), a first input from a first computing device and at least one second input from at least one other computing device; generating, with the TEE, a first function output of an n-party computation based on the first input and the at least one second input; encrypting, with the TEE, the first function output of the n-party computation using at least one public key of the at least one other computing device to produce at least one first encrypted output; communicating, with the TEE, the at least one first encrypted output to the first computing device; receiving, with the TEE from the first computing device, at least one first proof of publication associated with the at least one first encrypted output being posted to at least one blockchain accessible by the at least one other computing device; and in response to receiving the at least one first proof of publication from the first computing device, communicating, with the TEE, the first function output of the n-party computation to the first computing device.

Clause 7: The computer-implemented method of clause 6, further comprising: receiving, with the TEE, a witness of a witness encryption scheme from the first computing device; generating, with the TEE, a second function output based on the first input, the at least one second input, and the witness; encrypting, with the TEE, the second function output using the at least one public key to produce at least one second encrypted output; communicating, with the TEE, the at least one second encrypted output to the first computing device; receiving, with the TEE from the first computing device, at least one second proof of publication associated with the at least one second encrypted output being posted to the at least one blockchain; and, in response to receiving the at least one second proof of publication from the first computing device, communicating, with the TEE, the second function output to the first computing device.

Clause 8: The computer-implemented method of clause 6 or clause 7, further comprising: receiving, with the TEE from the at least one other computing device, the at least one first proof of publication; and, in response to receiving the at least one first proof of publication from the at least one other computing device, communicating, with the TEE, the first function output of the n-party computation to the at least one other computing device.

Clause 9: The computer-implemented method of any of clauses 6-8, further comprising: receiving, with the TEE from the at least one other computing device, the at least one second proof of publication; and, in response to receiving the at least one second proof of publication from the at least one other computing device, communicating, with the TEE, the second function output to the at least one other computing device.

Clause 10: The computer-implemented method of any of clauses 6-9, wherein the first function output comprises a signature of a data object generated based on the first input and the at least one second input, wherein the first input comprises a first signature key associated with the first computing device and the at least one second input comprises at least one second signature key associated with the at least one other computing device.

Clause 11: The computer-implemented method of any of clauses 6-10, wherein the TEE is configured to communicate with the first computing device in a first secure communication channel, in which only the first computing device is permitted to read communications from the TEE to the first computing device.

Clause 12: The computer-implemented method of any of clauses 6-11, wherein the TEE is configured to communicate with the at least one other computing device in at least one other secure communication channel, in which only the at least one other computing device is permitted to read communications from the TEE to the at least one other computing device.

Clause 13: A system comprising a server including at least one processor operating a trusted execution environment (TEE), the at least one processor programmed and/or configured to: receive a first input from a first computing device and at least one second input from at least one other computing device; generate a first function output of an n-party computation based on the first input and the at least one second input; encrypt the first function output of the n-party computation using at least one public key of the at least one other computing device to produce at least one first encrypted output; communicate the at least one first encrypted output to the first computing device; receive, from the first computing device, at least one first proof of publication associated with the at least one first encrypted output being posted to at least one blockchain accessible by the at least one other computing device; and, in response to receiving the at least one first proof of publication from the first computing device, communicate the first function output of the n-party computation to the first computing device.

Clause 14: The system of clause 13, wherein the at least one processor is further programmed and/or configured to: receive a witness of a witness encryption scheme from the first computing device; generate a second function output based on the first input, the at least one second input, and the witness; encrypt the second function output using the at least one public key to produce at least one second encrypted output; communicate the at least one second encrypted output to the first computing device; receive, from the first computing device, at least one second proof of publication associated with the at least one second encrypted output being posted to the at least one blockchain; and, in response to receiving the at least one second proof of publication from the first computing device, communicate the second function output to the first computing device.

Clause 15: The system of clause 13 or clause 14, further comprising the first computing device, wherein the first computing device and the at least one other computing device are permissioned by a consortium to access the at least one blockchain, wherein the first computing device is configured with at least read access and write access to the at least one blockchain, and the second computing device is configured with at least read access to the at least one blockchain.

Clause 16: The system of any of clauses 13-15, wherein the at least one processor is further programmed and/or configured to: receive, from the at least one other computing device, the at least one first proof of publication; and, in response to receiving the at least one first proof of publication from the at least one other computing device, communicate the first function output of the n-party computation to the at least one other computing device.

Clause 17: The system of any of clauses 13-16, wherein the at least one processor is further programmed and/or configured to: receive, from the at least one other computing device, the at least one second proof of publication; and, in response to receiving the at least one second proof of publication from the at least one other computing device, communicate the second function output to the at least one other computing device.

Clause 18: The system of any of clauses 13-17, wherein the first function output comprises a signature of a data object generated based on the first input and the at least one second input, wherein the first input comprises a first signature key associated with the first computing device and the at least one second input comprises at least one second signature key associated with the at least one other computing device.

Clause 19: The system of any of clauses 13-18, wherein the server is configured to communicate with the first computing device in a first secure communication channel, in which only the first computing device is permitted to read communications from the server to the first computing device.

Clause 20: The system of any of clauses 13-19, wherein the server is configured to communicate with the at least one other computing device in at least one other secure communication channel, in which only the at least one other computing device is permitted to read communications from the server to the at least one other computing device.

Clause 21: A computer program product comprising a non-transitory computer-readable medium storing program instructions configured to cause at least one processor to perform the method of any of clauses 1-12.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which.

DETAILED DESCRIPTION

Figure 1:
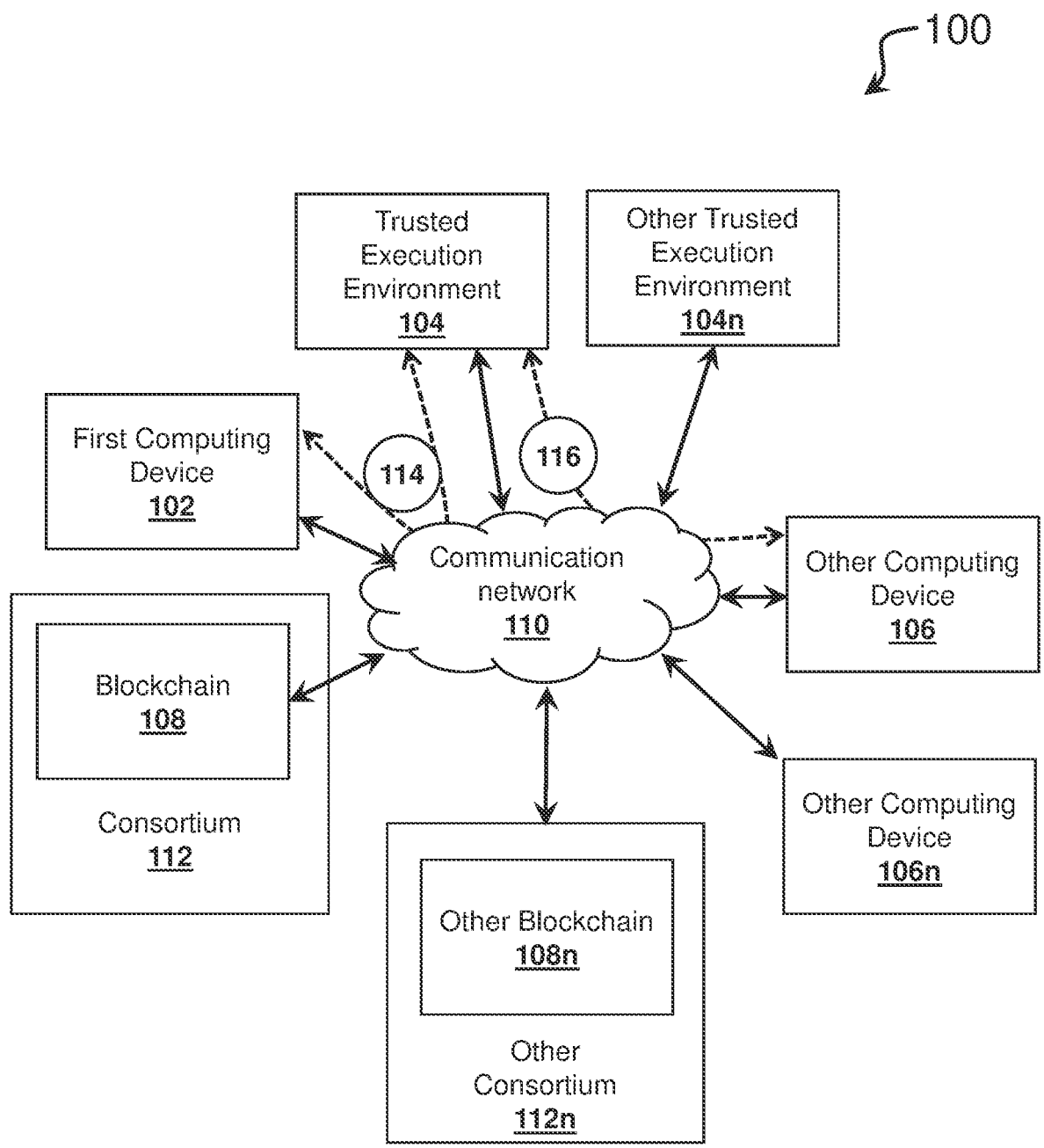
FIG. 1 is a diagram of a non-limiting embodiment or aspect of an environment in which systems, apparatuses, and/or methods, as described herein, may be implemented.

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, and/or any other device or system capable of communicating with a network.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices directly or indirectly communicating in the network environment may constitute a "system" or a "computing system."

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "computation" may refer to an exchange between two parties where input from both parties is required for both parties to determine an output. A computation may be an exchange where two parties are required to securely sign a document or data object. Secure multi-party computation is a subfield of cryptography, e.g., with a goal of creating methods for parties to jointly compute a function over their inputs while keeping those inputs private.

As used herein, the term "witness" may be taken from the context of "witness encryption." A witness encryption scheme may be defined for a nondeterministic polynomial time (NP) language with a corresponding witness relation R. In a witness encryption scheme, a user may encrypt a message M to a particular problem instance x to produce a ciphertext. A recipient of a ciphertext may be able to decrypt the message if x is in the language and the recipient knows a witness w where R(x,w) holds. However, if x is not in the language, then no polynomial-time attacker may distinguish between encryptions of any two equal length messages.

As used herein, the term "function output" may refer to the output of a computation. For example, a function output may include an output of an n-party joint computation given a set of inputs from the n parties.

As used herein, the term "trusted execution environment" (TEE) may refer to a secure area inside a main processor that runs parallel to an operating system in an isolated environment. For example, a TEE may guarantee that the code and data loaded into the TEE are protected with respect to confidentiality and integrity. A TEE may also attest to the correct execution of a program to a remote party.

As used herein, the term "consortium" may refer to a system, including one or more computing devices (e.g., servers and/or the like), that has a set of permissioned computing devices (e.g., a controlled user group) that may have varying levels of access to components of the system. The consortium may include and control access to, e.g., a blockchain.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

Non-limiting embodiments or aspects of the present disclosure are directed to a system, method, and computer program product for secure n-party computation. It will be appreciated that described systems and methods for 2-party exchange may be expanded to n-party computations, where n>1. Described embodiments and aspects provide improved technical solutions by providing an architecture for secure, fairness-assured joint computation. The described systems and methods provide fair secure computation in the (multi-)blockchain setting. Additionally, no third party intermediary computing devices need to be involved to assure fairness, reducing communication time associated with outside transmissions and decreasing the number of party resources (e.g., processing capacity) involved. Furthermore, the described systems and methods remove the possibility of a third party intermediary computing device colluding with one of the parties, thereby threatening security and fairness. In the presently described methods, a corrupt party may not receive the final output without the assurance that other participating parties also have access to joint computation.

In some non-limiting embodiments or aspects, systems and methods described herein may provide fair protocols for fair secure computation in the multi-blockchain setting. For example, in an n-party setting where t parties are corrupt (e.g., where t<n), the described protocols for fair secure computation will work where: (i) t parties have access to a trusted execution environment (TEE) and (ii) each of the t parties have read access and/or write access to a blockchain with each of the other parties. Furthermore, only these t parties need write access to said blockchains.

In some non-limiting embodiments or aspects, systems and methods described herein may make use of a synchronizable fair exchange ($F_{s,x}$), including in the ($\mathcal{G}_{att}$, $\mathcal{F}_{BB}$, $\mathcal{G}_{acrs}$)-hybrid model, where (i) $\mathcal{G}_{att}$ is a global ideal functionality that captures attested executions, (ii) $\mathcal{F}_{BB}$ is the ideal blockchain functionality, and in particular provides an interface for obtaining proof of publication, and (iii) $\mathcal{G}_{acrs}$ is the global ideal functionality for an augmented common reference string. For example, some non-limiting embodiments or aspects described herein may provide a variant of $F_{s,x}$ where only one party has the ability to trigger $F_{s,x}$. This may allow a pair of parties to reuse a single a priori loaded instance of $F_{s,x}$ (with one-sided trigger) in any number of multiparty protocols (possibly involving different sets of parties) thereby minimizing the use of blockchain.

In some non-limiting embodiments or aspects, secure multiparty computation (MPC) may allow a set of mutually distrusting parties to perform a joint computation on their inputs that reveals only the final output and nothing else. Such secure computation may be an important technical solution that may enable new business applications resulting from secure data sharing. In some non-limiting embodiments or aspects, systems and methods described herein may provide for solutions where not all parties may have read/write access on a single common blockchain. For example, there may exist multiple consortiums including separate blockchains having overlapping memberships. Since membership in a consortium may cost significant fees, members of a consortium $C_1$ may be restricted from performing read/write operations on the blockchain of consortium $C_2$ if they are not members of $C_2$. Without any visibility into the blockchain of $C_2$, members of $C_1$ may not trust $C_2$ to carry out a reliable blockchain read/write. While members within $C_2$ may trust that the associated blockchain $B_2$ is maintained properly, there is no reason for $P_1$, a member of $C_1$ but not $C_2$, to trust that this is the case.

In view of the foregoing, there are circumstances under which $P_1 \in C_1/C_2$ may accept a proof of publication on $B_2$. A proof of publication in a permissioned blockchain with m participants may be t+1 signatures from participating parties, where t<m/3 (or t<m/2) may be a threshold for a distributed consensus protocol that is used to maintain the permissioned blockchain. For $P_1$ to trust a proof of publication, $P_1$ may trust that there are, at most, t colluding parties in $C_2$. Since $P_1$ may not have control over membership constraints in $C_2$, $P_1$ may not find such a trust assumption reasonable. Similar issues may also apply to other consensus methods (e.g., proof of work, proof of stake). $P_1$ may not be able to obtain a (valid) proof of publication on $B_2$ which is otherwise accessible to every member of $C_2$.

In some non-limiting embodiments or aspects, in a single blockchain setting, parties $P_1$, $P_2$, and $P_3$ may each possess a TEE and each have access to a single blockchain B. $T_j$ may represent the TEE hosted by $P_j$. $P_i$ may have a secure channel established with $T_j$, such that $P_j$ may not read messages sent by $P_i$. In the first step, each $T_i$ may send a corresponding host input to $T_j$, following which $T_j$ may compute the function output on the provided inputs. However, $T_j$ may not yet release the outputs to host $P_j$ as there may be some $T_j$ that has not received all inputs. To ensure that all TEEs received the inputs, (i) each $T_j$ may post a token on the blockchain indicating that all inputs were received, (ii) each $T_j$ may receive from a corresponding host $P_j$ all three tokens from $T_1, T_2, T_3$ with respective proofs of publication on B, and (iii) then, the $T_j$ may release the function output to $P_j$.

If some $T_j$ releases the function output to $P_j$, then all three tokens may have been recorded on B, thereby making the above protocol fair. For example, an assumption may be that the proof of publication $\pi_v$ of posting a value v is unforgeable. Additionally or alternatively, it may be computationally infeasible for a party to compute $\pi_v$ without posting v on the blockchain. This in turn may imply that every $T_i$ obtained inputs from all participants. Furthermore, since all three tokens may be recorded on B, they may be available to $T_i$ (through $P_i$), following which $T_i$ will release the final output to $P_i$.

In some non-limiting embodiments or aspects, in a multi-blockchain setting, for example, there may be three consortiums $C_{\{1,2\}}, C_{\{2,3\}}, C_{\{1,3\}}$ such that $P_i, P_j \in C_{\{i,j\}}$ for $k \notin \{i,j\}$. $C_{\{i,j\}}$ may maintain blockchain $B_{\{i,j\}}$. A party $P_k$ for $k \notin \{i,j\}$ may not share the trust assumptions on $C_{\{i,j\}}$ as $P_i$ and $P_j$, and consequently may not trust proofs of publication on $B_{\{i,j\}}$. Alternatively, $P_k$ may not have read access to proofs on $B_{\{i,j\}}$, and consequently will not get the output. Therefore, a protocol which relies on read/write on a single blockchain, e.g., $B_{\{i,j\}}$, may not work.

For the purpose of illustration and not limitation, consider a setting with three permissioned consortiums, $C_1, C_2, C_3$, where $C_i$ has $m_i$ members and members of $C_i$ assume a corruption threshold $t_i < m_i/10$ within $C_i$. In some non-limiting embodiments or aspects, systems and methods described herein may provide a technical solution when there is a centralized adversary $\mathcal{A}$ that controls and coordinates all the corrupt parties across consortiums, such as when $\mathcal{A}$ corrupts a subset $A_i$ in $C_i$ with $|A_i| > t_i$ within a consortium, or $\mathcal{A}$ corrupts all members within a consortium.

In some non-limiting embodiments or aspects, systems and methods described herein may make use of synchronizable fair exchange ($F_{s,x}$). In said synchronizable fair exchange, $F_{s,x}$ may include a 2-party primitive that is reactive and/or may work in two phases, e.g., called "load" and "trigger." In the load phase, parties may submit private inputs $x_1, x_2$ along with public inputs ($f_1, f_2, \phi_1, \phi_2$), where $f_1, f_2$ are 2-output functions, and $\phi_1, \phi_2$ are Boolean predicates. Upon receiving these inputs, $F_{s,x}$ may compute $f_1(x_1, x_2)$ and/or deliver the respective outputs to both parties. Next, in the trigger phase, which may be initiated at any later time after the load phase, party $P_i$ may send a "witness" $w_i$ to $\mathcal{F}_{s,x}$ following which $F_{s,x}$ checks if $\phi_i(w_i)=1$. If that is indeed the case, then $\mathcal{F}_{s,x}$ may compute $f_2(x_1, x_2, w_i)$ and may deliver the respective outputs along with $w_i$ to both parties in a fair manner.

In some non-limiting embodiments or aspects, systems and methods described herein may use synchronizable fair exchange ($F_{s,x}$) with a one-sided trigger, in non-limiting embodiments or aspects. $\mathcal{F}_{s,x}$ may be restricted by giving only one designated party, e.g., $P_i$, the ability to trigger $F_{s,x}$. This may be done by setting $\phi_j = 0$, thereby ensuring that $P_j$ may never trigger $\mathcal{F}_{s,x}$. $P_i$ may still need to provide a valid witness that satisfies $\phi_i$. $F_{s,x}$ with a one-sided trigger may be implemented in described systems and methods when only $P_i$ possess a TEE.

For the purpose of illustration and not limitation, consider a $F_{s_f x}$ system with one-sided trigger and two parties $P_i, P_j$. Both parties may have access to a blockchain B, but only $P_i$ may possess a TEE ($T_i$). First, $P_i$ and $P_j$ may supply their inputs to $T_i$. $T_i$ may compute $y_1 = f_1(x_1, x_2)$ and may output $e_1 = \text{Enc}(pk_j, y_1)$ where $pk_j$ is the public key of $P_j$ and $\text{Enc}(a,b)$ is an encryption function that encrypts input b using an input key of a. Following this, $P_i$ may post $e_1$ on the blockchain B and/or obtain the corresponding proof of publication $\pi_1$. Then $P_i$ may feeds $\pi_1$ to $T_i$, which then may release the output $y_1$ to $P_i$. In some non-limiting embodiments or aspects, $P_j$ may recover $y_1$ by reading blockchain B and decrypting $e_1$ with secret key $sk_j$ of $P_j$. For the trigger phase, suppose $P_i$ has a valid witness $w_i$. Then $P_i$ may feed $w_i$ to $T_i$, which may verify if $\phi(w_i)=1$, and if so, may compute $y_2 = f_2(x_1, x_2, w_i)$ and may output $e_2 = \text{Enc}(pk_j, w_i || y_2)$ to $P_i$. As before, $P_i$ may post $e_2$ on blockchain B, get the proof of publication $\pi_2$, and/or feed $\pi_2$ to $T_i$, which may output $y_2$ to $P_i$. $P_j$ may read $e_2$ from blockchain B and decrypt $e_2$ to get $w_i$ and $y_2$.

In the above illustration, the trigger phase may be initiated only by $P_i$, since only $T_i$ may compute $f_2(x_1, x_2, w_i)$. It will be appreciated that the outputs of both $f_1$ and $f_2$ may be delivered to both parties in a fair manner. In particular, $P_1$ may not obtain the output of $f_1$ or $f_2$ without posting $e_1$ or $e_2$, respectively, on the blockchain. This may be because $T_i$ may reveal $y_1 = f_1(x_1, x_2)$ and $y_2 = f_2(x_1, x_2, w_i)$ only after obtaining $\pi_1$ and $\pi_2$, respectively, from the blockchain. This, in turn, may ensure that $e_1$ and $e_2$ were posted on the blockchain and are available for $P_j$ to decrypt and obtain $y_1$ and $y_2$, respectively. In some non-limiting embodiments or aspects, $P_i$ may prevent the evaluation of $f_1$ or $f_2$, but as described herein, if $P_i$ indeed obtains the outputs of $f_1$ or $f_2$, then $P_j$ may obtain the output as well. Additionally or alternatively, the load phase may be completed, but $P_i$ (e.g., a corrupt actor) may not trigger even if instructed by the higher level protocol. Additionally or alternatively, an honest $P_i$'s trigger may result in $P_i$ learning the output, and, in particular, there may be no way a corrupt $P_j$ may prevent $P_i$ from learning the output of $f_1$ or $f_2$.

In some non-limiting embodiments or aspects, $F_{s_f x}$ may be implemented where either party may trigger. For the purpose of illustration and not limitation, assume that both parties $P_i, P_j$ possess a TEE ($T_i, T_j$, respectively). Further, assume that $T_i$ and $T_j$ share a symmetric key $ek$. $P_i$ and $P_j$ may supply their inputs to $T_i$ and $T_j$. Then, $T_i$ and $T_j$ each may post a token on the blockchain indicating that each party has received the inputs. The TEEs may not proceed with the load phase unless they receive two proofs of publication of both tokens from the blockchain. Given these proofs, both $T_i$ and $T_j$ locally may output (respectively to $P_i$ and $P_j$) the value $f_1(x_1, x_2)$, and terminate the load phase. In this example, either party may trigger. The following description may account for $P_i$ initiating the trigger phase, but it will be appreciated that the actions for $P_j$ may be analogously the same.

When $P_i$ wishes to trigger, $P_i$ may provide a witness $w_i$ to $T_i$, following which $T_i$ may check if $\phi_i(w_i)=1$ and may output $e = \text{Enc}(ek, w_i || f_2(x_1, x_2, w_i))$ to $P_i$. $P_i$ then may post $e$ on the blockchain to obtain a proof of publication $\pi$, which $P_i$ then may send to $T_i$. Upon receiving the proof $\pi$, $T_i$ may output $f_2(x_1, x_2, w_i)$ to $P_i$ and/or terminate the trigger phase. Upon seeing the token $e$ on the blockchain, $P_j$ may send $e, \pi$ to $T_j$, which then may check if $\pi$ is a valid proof of publication, decrypt $e$ using $ek$ to obtain $w_i, f_2(x_1, x_2, w_i)$, check if $\phi_i(w_i) = 1$, and output $f_2(x_1, x_2, w_i)$ to $P_j$.

In some non-limiting embodiments or aspects, the outputs of $f_1$ and $f_2$ may be delivered to both parties in a fair manner. For example, $P_i$ may not obtain the output of $f_1$ unless tokens from both $T_i, T_j$ indicating that they received the inputs are recorded on the blockchain. When these tokens are recorded on the blockchain, there may be no way for $P_i$ to prevent $P_j$ from reading these tokens and/or submitting the tokens along with proofs to $T_j$, which may result in $P_j$ obtaining the output of $f_1$. If $P_i$ obtains the output of $f_2$, such as by providing the trigger witness $w_i$, then $P_i$ may have no way of preventing $P_j$ from learning the output of $f_2$. This may be because $P_i$ may need to provide proof $\pi$ that $e$ was posted on the blockchain. Since it may be infeasible for $P_i$ to obtain this proof without posting $e$ on the blockchain, it may follow that $e$ may be read by $P_j$, following which $P_j$ may feed $e$ to $T_j$ and obtain the final output. The triggering party may obtain the output if the triggering party behaves honestly, e.g., if $P_i$ initiates the trigger phase, and/or there may be no way for a corrupt $P_j$ to prevent $P_i$ from learning the output of $f_2$.

In some non-limiting embodiments or aspects, to construct fair protocols in the multiblockchain setting, the following transformations may be applied: for every pair of parties $P_i, P_j$, an $\mathcal{F}_{s_f x}$ instance may be added between them, if (i) at least one of $P_i, P_j$ possesses a TEE, and if (ii) $P_i$ and $P_j$ are on some common blockchain. An $\mathcal{F}_{s_f x}$ instance between $P_i$ and $P_j$ may be one-sided if exactly one of $P_i, P_j$ possesses a TEE.

In some non-limiting embodiments or aspects, the above transformation may abstract away both TEEs and blockchains, which may provide a setting with n parties, some of which may be connected by $\mathcal{F}_{s_f x}$ instances. This setting may be represented with an "$\mathcal{F}_{s_f x}$-diagraph" G, where the vertices may represent the n parties and edges may represent $\mathcal{F}_{s_f x}$ instances. If t parties possess a TEE, then G may consist of $O(nt+t^2)$ edges. Specifically, there may be a directed edge between i and j in G if (i) $P_i$ possesses a TEE, and if (ii) $P_i$ and $P_j$ share a common blockchain. In some non-limiting embodiments or aspects, systems and methods described herein may provide a fair protocol when G is not a complete diagraph.

In some non-limiting embodiments or aspects, fair secure computation may include fair reconstruction of a secret-sharing scheme. For example, the parties may run an (unfair) MPC protocol for a function $f$ that may compute the function output y, then may compute secret shares of the function output $\{y_i\}_{i \in [n]}$, and then may compute commitments (e.g., of a commitment scheme) on these secret shares. The commitments may be denoted by $c = (c_1, \ldots, c_n)$. Additionally or alternatively, the MPC protocol may output to party $P_i$ the values $y_i, c$. If an honest party does not obtain the output from the (unfair) MPC protocol, then all parties may terminate, and no one may obtain the final output y. In some non-limiting embodiments or aspects, to get a fair evaluation of $f$, either all parties may learn all the commitment openings or none of the parties may learn all the openings, e.g., in which an opening includes a message used in a reveal phase of a commitment scheme. In some non-limiting embodiments or aspects, the $\mathcal{F}_{s_f x}$ instances may be used to achieve fair reconstruction of y. For example, assume that $P_1, \ldots, P_t$ possess a TEE and $P_{t+1}, \ldots, P_n$ do not. Therefore, when $i \leq t$, $(i,j) \in G$ for all $j \in [n]$, and these may be the only edges in G. For the purpose of illustration and not limitation, an $\mathcal{F}_{s_f x}$ instance may be associated with $(i,j) \in G$ with t and $i < j$. This instance may be set up such that (i) the instance may be triggered only in round j+1; (ii) the predicate $\phi_i$ associated with this instance may check for valid openings of $c_1, \ldots, c_{j-1}$; and (iii) upon trigger, the value $y_j$ may be released to both parties. To reconstruct y, in round j+1 for 2≤j≤n, each party i (with t≤t and i<j) may trigger (if possible) the $\mathcal{F}_{s_yx}$ instance associated with (i,j)∈G. Finally, in round n+2, if any honest party obtained all the openings, e.g., the values $y_1, \ldots, y_n$, then said party may broadcast all these openings to all parties. In some non-limiting embodiments or aspects, the above steps may provide a fair protocol, e.g., in consideration of corrupt party actions. For example, if a corrupt party learns y at the end of the protocol, all honest parties may learn y too. For example, $P_j$ may be honest and for k<j, party $P_k$ may be corrupt. To learn y, the corrupt party may learn $y_i$ by triggering an $\mathcal{F}_{s_yx}$ instance associated with j. This consequently may mean that $P_j$ may learn all values $y_1, \ldots y_j$. If j≤t, then for all k>j, in round k+1, party $P_j$ may trigger the (j,k) $\mathcal{F}_{s_yx}$ instance using the functional outputs $y_1, \ldots, y_{k-1}$ to learn $y_k$. Then, in round n+2, party $P_j$ may broadcast all openings to all honest parties, and therefore all honest parties may obtain the final output.

In some non-limiting embodiments or aspects, if j>t, then $P_n$ may be honest since there may be at most t corrupt parties. To obtain $y_n$, and consequently the final output y, an adversary $\mathcal{A}$ may need some corrupt $P_i$ with i≤t to trigger the $\mathcal{F}_{s_yx}$ instance associated with (i,n)∈G. If $P_i$ triggers this $\mathcal{F}_{s_yx}$ instance, then honest $P_n$ may learn the functional outputs $y_1, \ldots, y_{n-1}$, and, therefore, may know all openings. Additionally or alternatively, $P_n$ may broadcast these openings in round n+2, which may lead to all honest parties obtaining the final output.

Referring now to FIG. 1, illustrated is a diagram of an example environment 100 in which devices, systems, and/or methods, described herein, may be implemented. As shown in FIG. 1, environment 100 may include a first computing device 102, a trusted execution environment (TEE) 104, one or more other computing devices 106, 106n, a blockchain 108, and a communication network 110. The TEE 104 may be implemented on the same device as the first computing device 102. One or more other blockchains 108n may be used, which may be accessible by one or more other computing devices 106, 106n. One or more other TEEs 104n may be used, for access by a computing device 102, 106, 106n, according to the steps disclosed herein.

Communication network 110 may include one or more wired and/or wireless networks. For example, communication network 110 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The first computing device 102 may be configured to communicate with the TEE 104 in a first secure communication channel 114, in which only the TEE 104 is permitted to read communications from the first computing device 102 to the TEE 104, and in which only the first computing device 102 is permitted to read communications from the TEE 104 to the first computing device 102. The other computing device 106 may be configured to communicate with the TEE 104 in a second secure communication channel 116, in which only the TEE 104 is permitted to read communications from the other computing device 106 to the TEE 104, and in which only the other computing device 106 is permitted to read communications from the TEE 104 to the other computing device 106. A same or similar communication channel to the second secure communication channel 116 may be employed for further other computing devices 106n. In some non-limiting embodiments or aspects, each computing device 102, 106, 106n may be associated with a corresponding TEE 104, 104n.

Environment 100 may include a consortium 112 or one or more other consortiums 112n, wherein each consortium 112, 112n may be associated with, and control access to, one or more blockchains 108, 108n. As illustrated, a consortium 112 may be associated with and/or control access to a blockchain 108, and other consortium 112n may be associated with, and controls access to, a blockchain 108n. In some non-limiting embodiments or aspects, the relationship of each consortium 112, 112n to one or more respective blockchains 108, 108n may be one-to-many. In some non-limiting embodiments or aspects, the first computing device 102 and one or more other computing devices 106, 106n may be permissioned by a consortium 112, 112n to access an associated blockchain 108, 108n. For example, the first computing device 102 and the one or more other computing devices 106, 106n may have a same or different permission level relative to access of a blockchain 108, 108n. The first computing device 102 may be configured (e.g., permissioned by a consortium 112, 112n) with at least read access and write access to a blockchain 108, 108n. Other computing devices 106, 106n may be configured (e.g., permissioned by a consortium 112, 112n) with at least read access to a blockchain 108, 108n. Alternatively, other computing devices 106, 106n may have both read and write access.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
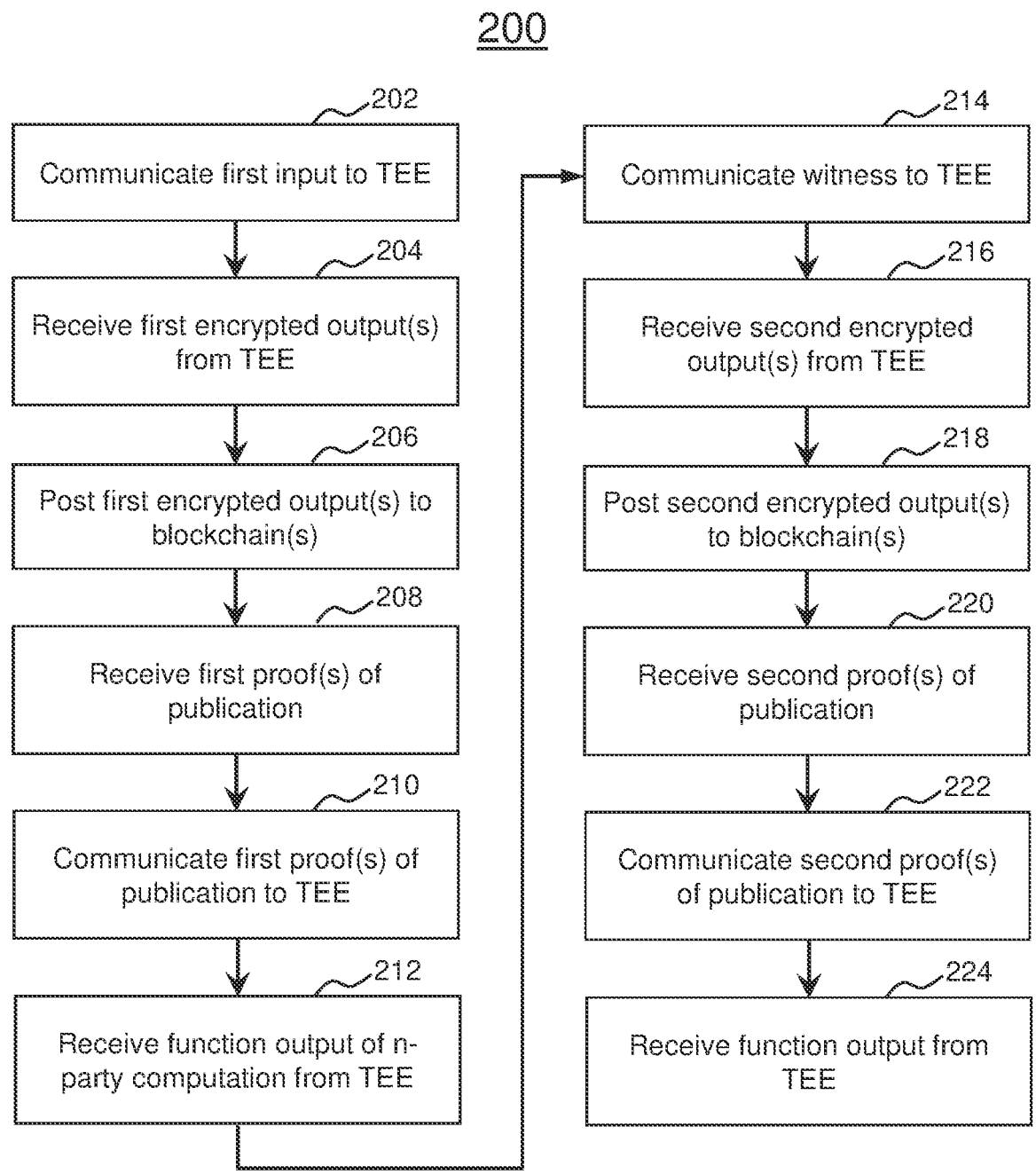
FIG. 2 is a flowchart illustrating a non-limiting embodiment or aspect of a method for secure n-party computation according to the principles of the present disclosure.

Referring now to FIG. 2, illustrated is a flowchart of a non-limiting embodiment or aspect of a process 200 for secure n-party computation. In some non-limiting embodiments or aspects, one or more of the steps of process 200 may be performed (e.g., completely, partially, and/or the like) by first computing device 102. In some non-limiting embodiments or aspects, one or more of the steps of process 200 may be performed (e.g., completely, partially, and/or the like) by another system, another device, another group of systems, or another group of devices, separate from or including first computing device 102, a TEE 104, other TEE 104n, other computing device 106, other computing device 106n, blockchain 108, other blockchain 108n, consortium 112, other consortium 112n, and/or the like. A processor used to perform one step may or may not be the same processor used to perform another step.

In step 202, a first input may be communicated. For example, a first computing device 102 may communicate a first input of an n-party computation to a TEE 104 (e.g., via a first secure communication channel 114 and/or the like).

In step 204, first encrypted outputs may be received. For example, the first computing device 102 may receive, e.g., from the TEE 104, at least one first encrypted output. In some non-limiting embodiments or aspects, the first encrypted output(s) may include a first function output of the n-party computation encrypted with at least one public key of at least one other computing device 106, 106n. For example, the first function output(s) of the n-party computation may be determined based on the first input from the first computing device 102 and at least one second input from the at least one other computing device 106, 106n. In some non-limiting embodiments or aspects, in a 2-party computation, a first computing device 102 may receive an encrypted output including the output of the 2-party computation encrypted with a public key of a second computing device 106. Additionally or alternatively, the output of the 2-party computation may be based on the first input of the first computing device 102 and a second input of the second computing device 106. In some non-limiting embodiments or aspects, in a 3-party computation, the first computing device 102 may receive two encrypted outputs including the output of the 3-party computation encrypted with public keys of a second computing device 106 and a third computing device 106n. Additionally or alternatively, the output of the 3-party computation may be based on the first input, a second input of the second computing device, and a third input of the third computing device.

In step 206, the first encrypted output(s) may be posted to at least one blockchain. For example, the first computing device 102 may post at least one first encrypted output on at least one blockchain 108 accessible by the at least one other computing device 106, 106n. Additionally or alternatively, other computing device(s) 106, 106n may access a same blockchain 108, different blockchains 108n, or a combination thereof.

In step 208, at least one first proof of publication may be received. For example, the first computing device 102 may, in response to (e.g., based on, triggered by, and/or the like) posting the at least one first encrypted output on the at least one blockchain 108, 108n, receive at least one first proof of publication from the blockchain 108, 108n.

In step 210, the at least one first proof of publication may be communicated. For example, the first computing device 102 may communicate the at least one first proof of publication to the TEE 104.

In step 212, a first function output (e.g., an output of an n-party computation) may be received. For example, the first computing device 102 may receive a first function output of the n-party computation from the TEE 104.

In step 214, a witness may be communicated. For example, the first computing device 102 may communicate a witness to the TEE 104.

In step 216, at least one second encrypted output may be received. For example, the first computing device 102 may receive at least one second encrypted output from the TEE 104. In some non-limiting embodiments or aspects, the second encrypted output(s) may include a second function output encrypted with the at least one public key of the at least one other computing device 106, 106n. Additionally or alternatively, the second function output may be determined based on the first input, the at least one second input, and the witness.

In step 218, the at least one second encrypted output may be posted to at least one blockchain. For example, the first computing device 102 may post the at least one second encrypted output on the at least one blockchain 108, 108n. In some non-limiting embodiments or aspects, the at least one second encrypted output may be decryptable using the at least one private key of the at least one other computing device 106, 106n, corresponding to the at least one public key, to obtain the second function output.

In step 220, at least one second proof of publication may be received. For example, the first computing device 102 may, in response to (e.g., based on, triggered by, and/or the like) posting the at least one second encrypted output on the at least one blockchain 108, 108n, receive at least one second proof of publication from the at least one blockchain 108, 108n.

In step 222, the at least one second proof of publication may be communicated. For example, the first computing device 102 may communicate the at least one second proof of publication to the TEE 104.

In step 224, a function output based on a witness may be received. For example, the first computing device 102 may receive the second function output from the TEE 104.

Figure 3:
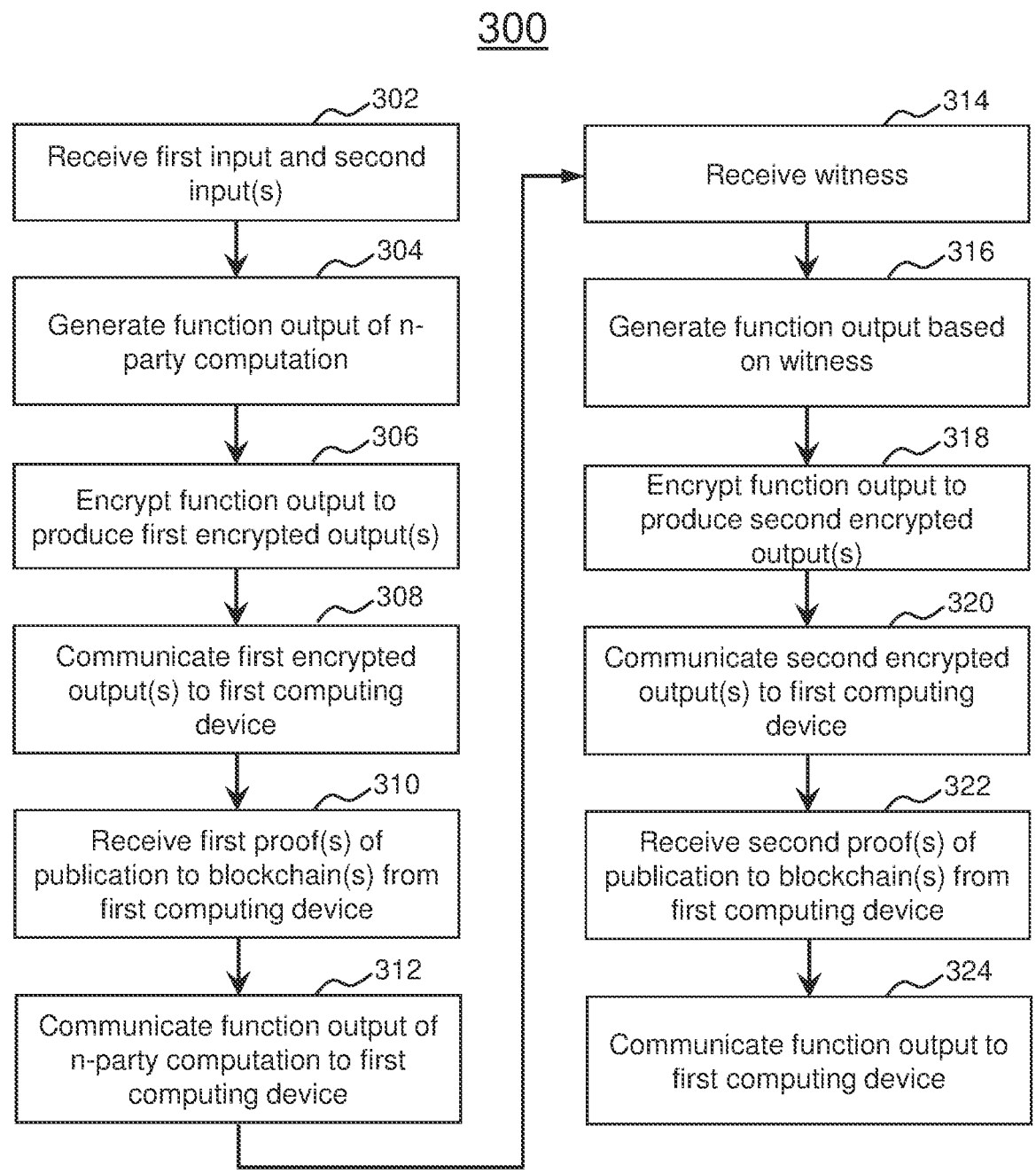
FIG. 3 is a flowchart illustrating a non-limiting embodiment or aspect of a method for secure n-party computation according to the principles of the present disclosure.

Referring now to FIG. 3, illustrated is a flowchart of some non-limiting embodiments or aspects of a process 300 for secure n-party computation. In some non-limiting embodiments or aspects, one or more of the steps of process 300 may be performed (e.g., completely, partially, and/or the like) by a TEE 104. In some non-limiting embodiments or aspects, one or more of the steps of process 300 may be performed (e.g., completely, partially, and/or the like) by another system, another device, another group of systems, or another group of devices, separate from or including TEE 104, such as, first computing device 102, other TEE 104n, other computing device 106, other computing device 106n, blockchain 108, other blockchain 108n, consortium 112, other consortium 112n, and/or the like. A processor used to perform one step may or may not be the same processor used to perform another step.

In step 302, a first input and at least one second input may be received. For example, the TEE 104 may receive a first input from a first computing device 102 and at least one second input from at least one other computing device 106, 106n.

In step 304, a first function output may be generated. For example, the TEE 104 may generate a first function output of an n-party computation based on the first input and the at least one second input. In some non-limiting embodiments or aspects, the first function output may be a signature of a data object generated based on the first input and the at least one second input. Additionally or alternatively, the first input may include a first signature key (e.g., private key used for digital signatures) associated with the first computing device 102 and the at least one second input may include at least one second signature key associated with the at least one other computing device 106, 106n.

In step 306, the first function output may be encrypted. For example, the TEE 104 may encrypt the first function output of the n-party computation using at least one public key of the at least one other computing device 106, 106n to produce at least one first encrypted output.

In step 308, the at least one first encrypted output may be communicated. For example, TEE 104 may communicate the at least one first encrypted output to the first computing device 102.

In step 310, at least one first proof of publication may be received. For example, the TEE 104 may receive, from the first computing device 102, at least one first proof of publication associated with the at least one first encrypted output being posted to at least one blockchain 108, 108n accessible by the at least one other computing device 106, 106n.

In step 312, the first function output may be communicated. For example, the TEE 104 may, in response to (e.g., based on, triggered by, and/or the like) receiving the at least one first proof of publication, communicate the first function output of the n-party computation to the first computing device 102.

In step 314, the witness may be received. For example, the TEE 104 may receive a witness from the first computing device 102.

In step 316, a second function output may be generated. For example, the TEE 104 may generate a second function output based on the first input, the at least one second input, and the witness.

In step 318, the second function output may be encrypted. For example, the TEE 104 may encrypt the second function output using the at least one public key to produce at least one second encrypted output.

In step 320, the at least one second encrypted output may be communicated. For example, the TEE 104 may communicate the at least one second encrypted output to the first computing device 102.

In step 322, at least one second proof of publication may be received. For example the TEE 104 may receive, from the first computing device 102, at least one second proof of publication associated with the at least one second encrypted output being posted to the at least one blockchain 108, 108n.

In step 324, the second function output may be communicated. For example, the TEE 104 may, in response to (e.g., based on, triggered by, and/or the like) receiving the at least one second proof of publication, communicate the second function output to the first computing device 102.

Figure 4:
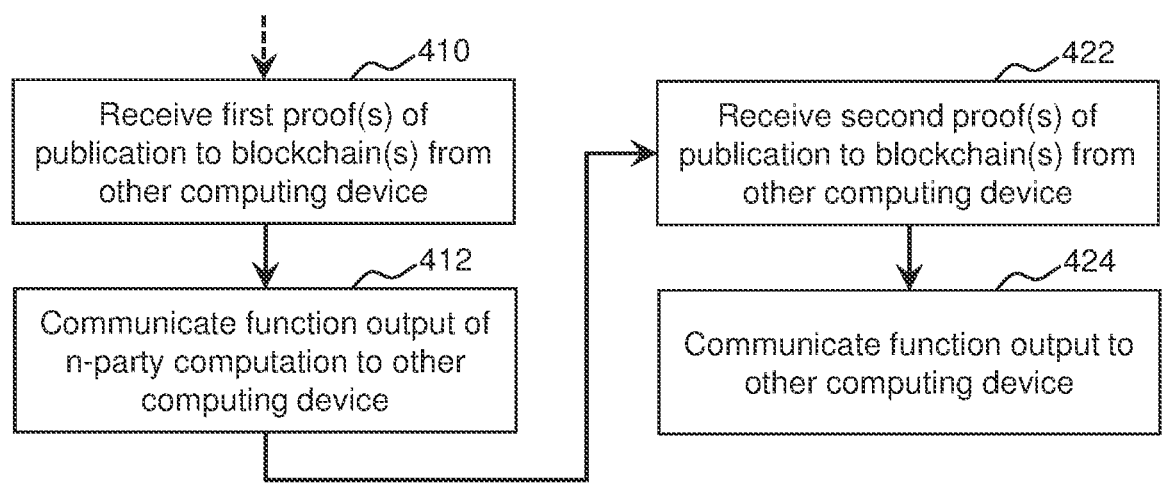
FIG. 4 is a flowchart illustrating a non-limiting embodiment or aspect of a method for secure n-party computation according to the principles of the present disclosure.

Referring now to FIG. 4, illustrated is a flowchart of some non-limiting embodiments or aspects of a process 400 for secure n-party computation. In some non-limiting embodiments or aspects, one or more of the steps of process 400 may be performed (e.g., completely, partially, and/or the like) by a TEE 104. In some non-limiting embodiments or aspects, one or more of the steps of process 400 may be performed (e.g., completely, partially, and/or the like) by another system, another device, another group of systems, or another group of devices, separate from or including TEE 104, such as, first computing device 102, other TEE 104n, other computing device 106, other computing device 106n, blockchain 108, other blockchain 108n, consortium 112, other consortium 112n, and/or the like. A processor used to perform one step may or may not be the same processor used to perform another step.

In step 410, at least one first proof of publication may be received. For example, the TEE 104 may receive, from at least one other computing device, at least one first proof of publication associated with the at least one first encrypted output being posted to at least one blockchain 108, 108n accessible by the at least one other computing device 106, 106n.

In step 412, the first function output may be communicated. For example, the TEE 104 may, in response to (e.g., based on, triggered by, and/or the like) receiving the at least one first proof of publication from the at least one other computing device 106, 106n, communicate the first function output of the n-party computation to the at least one other computing device 106, 106n.

In some non-limiting embodiments or aspects, steps 410 and 412 may be executed after a first computing device 102 has posted the encrypted function output to the blockchain 108, 108n, e.g., after step 308 in FIG. 3.

In step 422, at least one second proof of publication may be received. For example, the TEE 104 may receive, from at least one other computing device 106, 106n, at least one second proof of publication associated with the at least one second encrypted output being posted to the at least one blockchain 108, 108n.

In step 424, the second function output may be communicated. For example, the TEE 104 may, in response to (e.g., based on, triggered by, and/or the like) receiving the at least one second proof of publication from the at least one other computing device 106, 106n, communicate the second function output to the at least one other computing device.

In some non-limiting embodiments or aspects, steps 422 and 424 may be executed after a first computing device 102 has posted the second encrypted output to the blockchain 108, 108n, e.g., after step 320 in FIG. 3.

Figure 5:
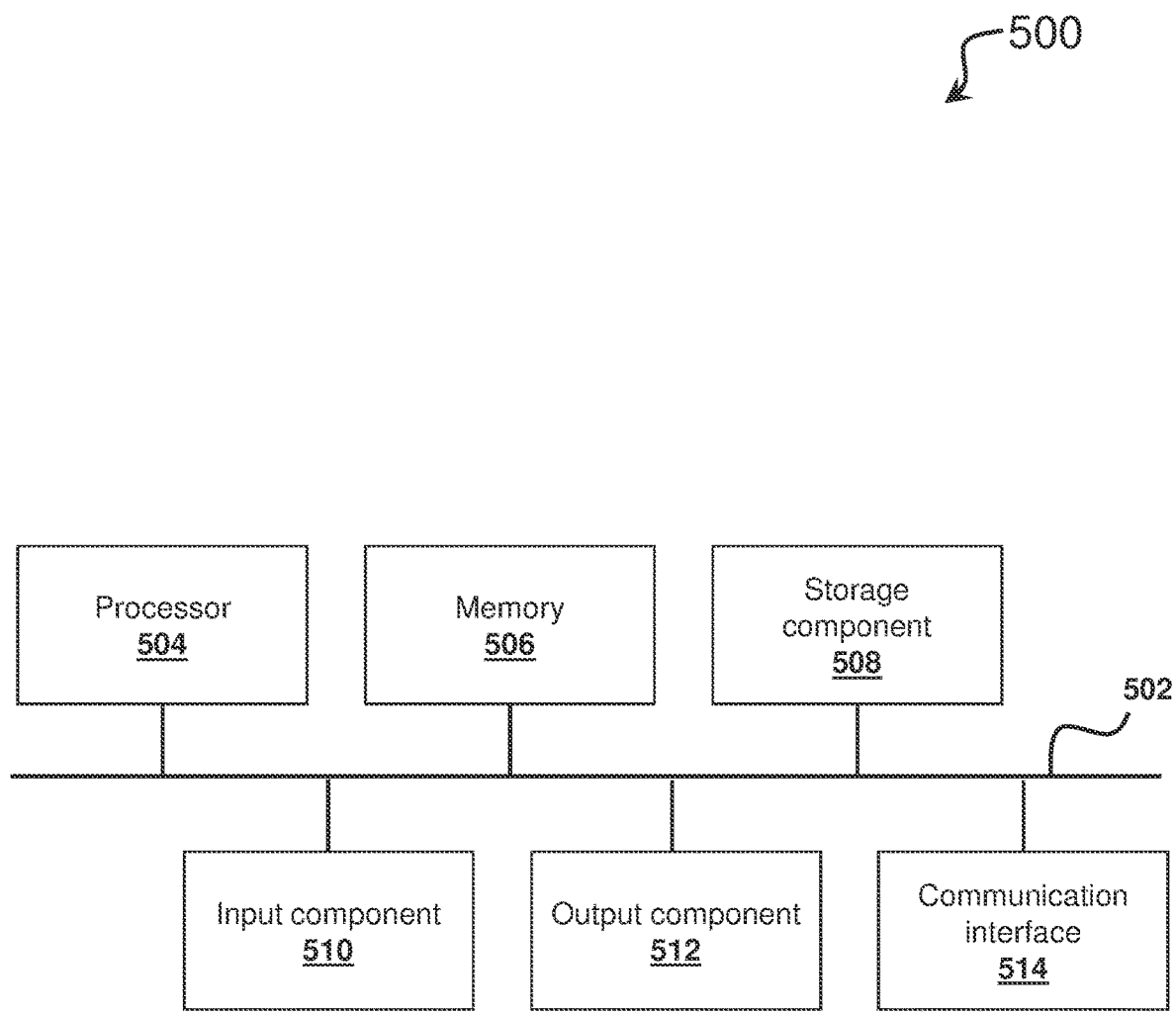
FIG. 5 is a diagram of a non-limiting embodiment or aspect of components of one or more devices of FIG. 1.

Referring now to FIG. 5, illustrated is a diagram of example components of device 500. Device 500 may correspond to one or more devices of first computing device 102, one or more devices of trusted execution environments 104, 104n, one or more devices of other computing devices 106, 106n, one or more devices of blockchains 108, 108n, one or more devices of consortiums 112, 112n, and/or one or more devices of communication network 110. In some non-limiting embodiments or aspects, one or more devices of the foregoing may include at least one device 500 and/or at least one component of device 500. As shown in FIG. 5, device 500 may include bus 502, processor 504, memory 506, storage component 508, input component 510, output component 512, and communication interface 514.

Bus 502 may include a component that permits communication among the components of device 500. In some non-limiting embodiments or aspects, processor 504 may be implemented in hardware, software, or a combination of hardware and software. For example, processor 504 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that may be programmed to perform a function. Memory 506 may include random access memory (RAM), read-only memory (ROM), and/or another type of dynamic or static storage device (e.g., flash memory, magnetic memory, optical memory, etc.) that stores information and/or instructions for use by processor 504.

Storage component 508 may store information and/or software related to the operation and use of device 500. For example, storage component 508 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 510 may include a component that permits device 500 to receive information, such as via user input (e.g., a touchscreen display, a keyboard, a keypad, a mouse, a button, a switch, a microphone, a camera, etc.). Additionally or alternatively, input component 510 may include a sensor for sensing information (e.g., a global positioning system (GPS) component, an accelerometer, a gyroscope, an actuator, etc.). Output component 512 may include a component that provides output information from device 500 (e.g., a display, a speaker, one or more light-emitting diodes (LEDs), etc.).

Communication interface 514 may include a transceiver-like component (e.g., a transceiver, a separate receiver and transmitter, etc.) that enables device 500 to communicate with other devices, such as via a wired connection, a wireless connection, or a combination of wired and wireless connections. Communication interface 514 may permit device 500 to receive information from another device and/or provide information to another device. For example, communication interface 514 may include an Ethernet interface, an optical interface, a coaxial interface, an infrared interface, a radio frequency (RF) interface, a universal serial bus (USB) interface, a WiFi® interface, a cellular network interface, and/or the like.

Device 500 may perform one or more processes described herein. Device 500 may perform these processes based on processor 504 executing software instructions stored by a computer-readable medium, such as memory 506 and/or storage component 508. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 506 and/or storage component 508 from another computer-readable medium or from another device via communication interface 514. When executed, software instructions stored in memory 506 and/or storage component 508 may cause processor 504 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 506 and/or storage component 508 may include data storage or one or more data structures (e.g., a database, and/or the like). Device 500 may be capable of receiving information from, storing information in, communicating information to, or searching information stored in the data storage or one or more data structures in memory 506 and/or storage component 508. For example, the information may include encryption data, input data, output data, transaction data, account data, or any combination thereof.

The number and arrangement of components shown in FIG. 5 are provided as an example. In some non-limiting embodiments or aspects, device 500 may include additional components, fewer components, different components, or differently arranged components than those shown in FIG. 5. Additionally or alternatively, a set of components (e.g., one or more components) of device 500 may perform one or more functions described as being performed by another set of components of device 500.

Although the disclosure has been described in detail for the purpose of illustration based on what is currently considered to be the most practical and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect may be combined with one or more features of any other embodiment or aspect.

What is claimed is:

1. A system comprising a first computing device programmed or configured to:

communicate a first input of an n-party computation to a trusted execution environment (TEE);

receive, from the TEE, at least one first encrypted output comprising a first function output of the n-party computation encrypted with at least one public key of at least one other computing device, the first function output of the n-party computation determined based on the first input and at least one second input from the at least one other computing device;

post the at least one first encrypted output on at least one blockchain accessible by the at least one other computing device, the at least one first encrypted output being decryptable using at least one private key of the at least one other computing device to obtain the first function output of the n-party computation;

in response to posting the at least one first encrypted output on the at least one blockchain, receive at least one first proof of publication;

communicate the at least one first proof of publication to the TEE;

receive the first function output of the n-party computation from the TEE;

communicate a witness of a witness encryption scheme to the TEE;

receive at least one second encrypted output comprising a second function output encrypted with the at least one public key of the at least one other computing device, the second function output determined based on the first input, the at least one second input, and the witness;

post the at least one second encrypted output on the at least one blockchain, the at least one second encrypted output being decryptable using the at least one private key to obtain the second function output;

in response to posting the at least one second encrypted output on the at least one blockchain, receive at least one second proof of publication;

communicate the at least one second proof of publication to the TEE; and receive the second function output from the TEE.

2. The system of claim 1, wherein the first computing device and the at least one other computing device are permissioned by a consortium to access the at least one blockchain, and wherein the first computing device and the at least one other computing device have different levels of permission to access the at least one blockchain.

3. The system of claim 2, wherein the first computing device is configured with at least read access and write access to the at least one blockchain, and the at least one other computing device is configured with at least read access to the at least one blockchain.

4. The system of claim 1, wherein the first function output comprises a signature of a data object generated based on the first input and the at least one second input, wherein the first input comprises a first signature key associated with the first computing device and the at least one second input comprises at least one second signature key associated with the at least one other computing device.

5. The system of claim 1, wherein the first computing device is configured to communicate with the TEE in a first secure communication channel, in which only the TEE is permitted to read communications from the first computing device to the TEE.

6. The system of claim 1, wherein the at least one other computing device comprises a second computing device and a third computing device, wherein the at least one second input comprises an input from the second computing device and an input from the third computing device, and wherein the first function output of the n-party computation is determined based on the first input, the input from the second computing device, and the input from the third computing device.

7. The system of claim 6, wherein the at least one public key comprises a public key of the second computing device and a public key of the third computing device, wherein the at least one second encrypted output comprises the second function output encrypted with the public key of the second computing device and the public key of the third computing device, and wherein the second function output is determined based on the first input, the input of the second computing device, the input of the third computing device, and the witness.

8. A computer program product comprising a non-transitory computer-readable medium storing program instructions configured to cause at least one processor of a first computing device to:
communicate a first input of an n-party computation to a trusted execution environment (TEE);
receive, from the TEE, at least one first encrypted output comprising a first function output of the n-party computation encrypted with at least one public key of at least one other computing device, the first function output of the n-party computation determined based on the first input and at least one second input from the at least one other computing device;
post the at least one first encrypted output on at least one blockchain accessible by the at least one other computing device, the at least one first encrypted output being decryptable using at least one private key of the at least one other computing device to obtain the first function output of the n-party computation;
in response to posting the at least one first encrypted output on the at least one blockchain, receive at least one first proof of publication;
communicate the at least one first proof of publication to the TEE;
receive the first function output of the n-party computation from the TEE;
communicate a witness of a witness encryption scheme to the TEE;
receive at least one second encrypted output comprising a second function output encrypted with the at least one public key of the at least one other computing device, the second function output determined based on the first input, the at least one second input, and the witness;
post the at least one second encrypted output on the at least one blockchain, the at least one second encrypted output being decryptable using the at least one private key to obtain the second function output;
in response to posting the at least one second encrypted output on the at least one blockchain, receive at least one second proof of publication;
communicate the at least one second proof of publication to the TEE; and
receive the second function output from the TEE.

9. The computer program product of claim 8, wherein the first computing device and the at least one other computing device are permissioned by a consortium to access the at least one blockchain, and wherein the first computing device and the at least one other computing device have different levels of permission to access the at least one blockchain.

10. The computer program product of claim 9, wherein the first computing device is configured with at least read access and write access to the at least one blockchain, and the at least one other computing device is configured with at least read access to the at least one blockchain.

11. The computer program product of claim 8, wherein the first function output comprises a signature of a data object generated based on the first input and the at least one second input, wherein the first input comprises a first signature key associated with the first computing device and the at least one second input comprises at least one second signature key associated with the at least one other computing device.

12. The computer program product of claim 8, wherein the program instructions cause the at least one processor to communicate with the TEE in a first secure communication channel, in which only the TEE is permitted to read communications from the at least one processor to the TEE.

13. The computer program product of claim 8, wherein the at least one other computing device comprises a second computing device and a third computing device, wherein the at least one second input comprises an input from the second computing device and an input from the third computing device, and wherein the first function output of the n-party computation is determined based on the first input, the input from the second computing device, and the input from the third computing device.

14. The computer program product of claim 13, wherein the at least one public key comprises a public key of the second computing device and a public key of the third computing device, wherein the at least one second encrypted output comprises the second function output encrypted with the public key of the second computing device and the public key of the third computing device, and wherein the second function output is determined based on the first input, the input of the second computing device, the input of the third computing device, and the witness.

* * * * *